United States Patent [19]

Hilpert et al.

[11] Patent Number: 5,446,852
[45] Date of Patent: Aug. 29, 1995

[54] METHOD OF REDUCING NOISE SIGNALS CAUSED BY FLUCTUATIONS IN POWER REQUIREMENTS OF DIGITAL SIGNAL PROCESSOR HAVING RECURRING WAIT ROUTINES

[75] Inventors: Thomas Hilpert, Gundelfingen; Stefan Mueller, Freiburg; Juergen Becher, Emmendingen; Wilfried W. Gehrig, March, all of Germany

[73] Assignee: Deutsche ITT Industries GmbH, Freiburg, Germany

[21] Appl. No.: 283,926

[22] Filed: Aug. 1, 1994

Related U.S. Application Data

[63] Continuation of Ser. No. 46,054, Apr. 12, 1993, abandoned.

[30] Foreign Application Priority Data

Apr. 24, 1992 [DE] Germany ............... 42 13 504.4

[51] Int. Cl.$^6$ ............................................. G06F 15/00
[52] U.S. Cl. ........................................ 395/375; 395/750; 364/DIG. 1; 364/DIG. 2
[58] Field of Search ................. 395/375, 750; 364/736

[56] References Cited

U.S. PATENT DOCUMENTS

| | | | |
|---|---|---|---|
| 3,651,777 | 3/1972 | Bartlett et al. | 340/172.5 |
| 4,758,945 | 7/1988 | Remedi | 395/550 |
| 5,010,506 | 4/1991 | Hrncirik | 364/721 |
| 5,072,414 | 12/1991 | Buisker et al. | 395/550 |
| 5,138,709 | 8/1992 | Jones et al. | 395/575 |
| 5,249,199 | 9/1993 | Mayer et al. | 375/1 |

FOREIGN PATENT DOCUMENTS

4213504  6/1993  Germany .

Primary Examiner—Robert B. Harrell
Assistant Examiner—Zarni Maung
Attorney, Agent, or Firm—Thomas L. Peterson

[57] ABSTRACT

A method utilizing a predetermined set of instructions in a wait routine reduces spurious signals caused by the power consumption of processors, particularly digital signal processors, which is dependent on the instruction code being executed. These spurious signals occur, for example, in processors performing cyclically recurring program routines which are initiated by interrupts where, during the run time of the routines, a first mean power consumption results, and where the run time of the program routines is shorter than the time between two successive interrupts. The cyclic changes in power consumption caused by this mode of operation of the digital signal processor are avoided by performing a wait routine between successive program routines which includes instructions selected to cause a mean power consumption of the processor during the wait routine to correspond to that during the program routines.

16 Claims, 3 Drawing Sheets

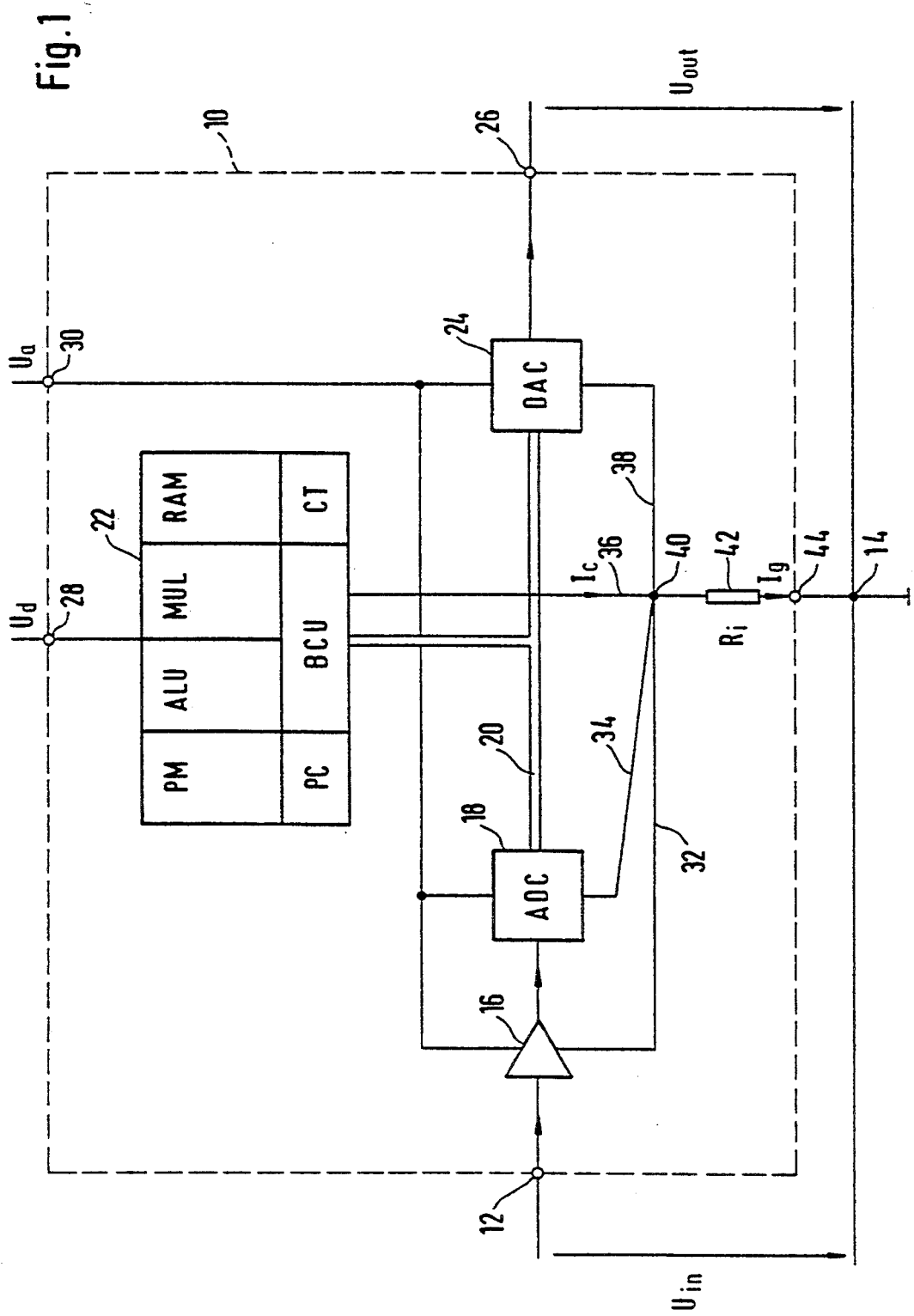

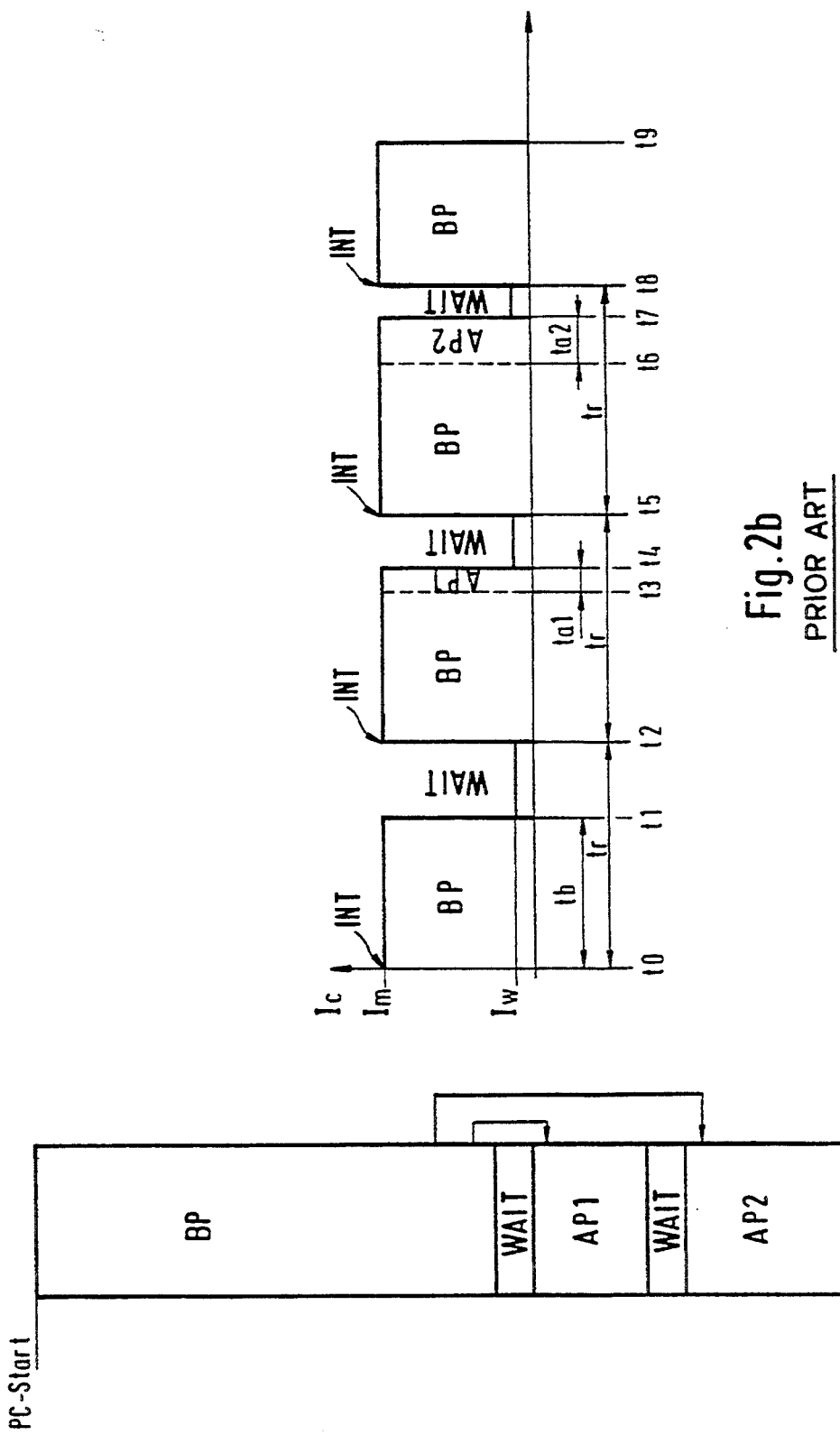

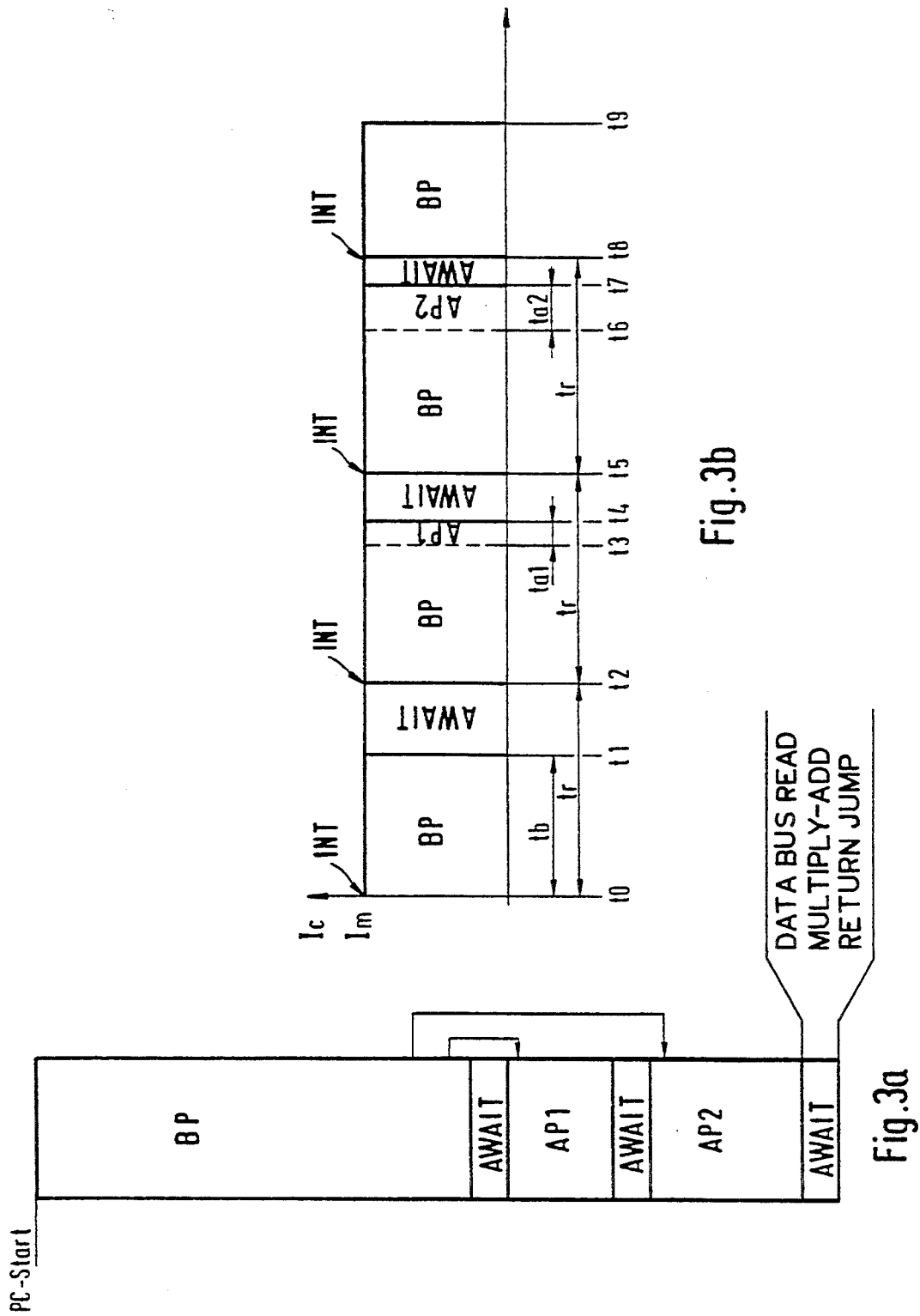

METHOD OF REDUCING NOISE SIGNALS CAUSED BY FLUCTUATIONS IN POWER REQUIREMENTS OF DIGITAL SIGNAL PROCESSOR HAVING RECURRING WAIT ROUTINES

This is a continuation of application Ser. No. 08/046,054 filed Apr. 12, 1993 now abandoned.

BACKGROUND OF THE INVENTION

1. Field of the Invention

The present invention relates to a method of reducing spurious signals caused by the power consumption of processors, particularly digital signal processors, which power consumption is dependent on the instruction code being executed.

2. Description of the Related Art

Processors often perform cyclically recurring program routines which are initiated by interrupts. During the run time of such routines, which run time is shorter than the time between two successive interrupts, a first mean power consumption may result. The ohmic resistance or inductive reactance of supply voltage leads causes voltage drops which are dependent on the power consumption of the components or units connected thereto, This may result in superimposed spurious voltages at the supply voltage terminals of the components or units. Inductive or capacitive coupling may cause crosstalk from the supply voltage leads to signal inputs, particularly of analog subcircuits.

In assemblies with digital signal processing, one such unwanted signal source is the digital signal processor, which contains units with different power consumptions, such as an adder, a subtracter, a multiplier, an accumulator (ACCU), a RAM, and a data bus interface. If such a digital signal processor performs cyclically recurring program routines, the latter will result in a mean power consumption of the signal processor which is determined by the frequency and type of the instruction code used. Such cyclically recurring program routines occur, for example, during the digital processing of audio signals, which involves writing in digitized input values at a predetermined repetition rate, processing these values by program routines, such as, for example, filter functions, and subsequently outputting the changed values. The run time of these program routines must be chosen to be shorter than the time between two input values to be processed, because otherwise erroneous results may be produced.

For the time between the end of a program routine and the next input value to be processed, which may be signalled by an interrupt, for example, the signal processor either is placed in a specific, generally particularly current-saving, wait state (i e., "WAIT" instruction code) or it remains in an endless loop, which can be left if an interrupt occurs.

Due to this constant change between the execution of a program routine, during which, as a rule, all internal units of the signal processor are activated, and a wait state with low power consumption, the signal processor causes not only spurious signals in a frequency range determined by its instruction execution time, but also spurious signals resulting from this change.

Thus, besides the spurious signals at a frequency which is dependent on the instruction execution time and, as a rule, lies far above the useful signal to be processed, at least one further spurious signal is generated whose amplitude and frequency are dependent on the constant change between program routine and wait state, and whose signal spectrum can lie within the frequency range of the useful signal or in the vicinity of this frequency range.

If coupling exists between the signal processor and the analog subcircuits, even small spurious signals which occur on the supply voltage, which serves as a reference potential for the analog signals to be processed, or which are coupled to signal inputs by inductive or capacitive crosstalk, will have a disturbing effect.

Independently of the implementation of a unit on a printed circuit board or in an integrated circuit, particular conductor routings for the reference potential with respect to a common reference point are only possible to a limited extent. A symmetrical analog signal which is free from a reference potential needs additional connection points and lines.

It is, therefore, the object of the invention to provide a method whereby the spurious signals caused by the cyclic operation of the processor can be reduced.

SUMMARY OF THE INVENTION

According to the invention, between successive program routines, the processor performs a wait routine which causes a mean power consumption corresponding to that during the program routines.

The program routines, at their end, no longer lead to a wait state with low power consumption of the processor, but to a wait routine during the execution of which the processor has a mean power consumption which is, as far as possible, unchanged from that during the execution of the program routines. Cyclically recurring abrupt changes in the mean power consumption of the processor are thus eliminated.

If a program routine is resumed in response to an interrupt signal, the wait routine will be aborted. It must be so designed, of course, that no data necessary for the execution of program routines are changed.

Advantageously, the wait routine comprises a sequence of instruction codes which causes a statistical power consumption distribution of the processor that approximately corresponds to the statistical power consumption distribution of the program routines. As a result of this approximately equal statistical power consumption distribution of the wait routine, even during the latter, a constant spurious-signal spectrum is achieved in the range of the instruction cycle time. Mixture products that may be caused by cyclic changes in the spurious-signal spectrum are also avoided.

To achieve this approximately equal statistical power consumption distribution, no corresponding distribution of all instruction codes used in the program routines is required, since individual instruction codes are representative of the power consumption of entire groups of instruction codes. A wait routine with the required properties can thus be implemented with few selected instruction codes.

An advantageous wait routine, comprising a data bus read instruction, a multiply-add instruction, and a return jump to the data bus read instruction, allows for the fact that in program routines for filter computation, about 60% of the instruction codes used are data-bus accesses and multiply-add operations with relatively high power consumption of the processor, while the remaining instructions, such as program branch instructions, are instructions with low power consumption.

The data bus read instruction at the beginning of the wait routine is particularly advantageous if during the wait routine the data bus is in an undefined state with variable contents. Thus, by constantly changing input values, varying power consumptions of the processor are taken into account which are dependent on the value of the data being processed.

In one embodiment of the invention, the wait routine can be stored as a sequence of instruction codes in the processor's program memory and executed following the program routines. This allows a simple adaptation of existing application programs.

In another embodiment of the invention, for new processors, the wait routine can be implemented as a sequence of instruction codes in the microcode of the processor and invoked via a predetermined instruction code. This solution requires less program-memory space than a wait routine stored in the program memory of the signal processor, but the microcode of the processor must be adapted to the new method.

BRIEF DESCRIPTION OF THE DRAWINGS

The invention will now be explained in more detail with reference to the accompanying drawings, in which:

FIG. 1 is an exemplary block diagram of a unit with analog and digital signal processing;

FIGS. 2a and 2b show the allocation of the program memory of a digital signal processor to program routines and the corresponding power consumption during execution of the program routines in the prior art; and FIGS. 3a and 3b show the allocation of the program memory of a digital signal processor in whose microcode is implemented a wait routine in accordance with the present invention, and the corresponding power consumption during the execution of program routines and the wait routine.

DETAILED DESCRIPTION OF THE PREFERRED EMBODIMENT

FIG. 1 shows a block diagram of a unit for analog and digital signal processing. This unit 10 can be implemented both on a printed circuit board and in an integrated circuit on a chip.

An input 12 of the unit 10 is supplied with an analog signal $U_{in}$, whose reference potential is a ground 14. After being amplified by an analog amplifier 16, the analog input signal $U_{in}$ is fed to the input of an analog-to-digital converter 18, which produces an equivalent digital signal at a predetermined repetition rate. The output of the analog-to-digital converter 18 is connected via a data and control bus 20 to a digital signal processor 22. The essential constituents of this signal processor 22 are a program memory PM, an addressing unit PC for the program memory, an ALU with an accumulator, a multiplier MUL, a random access memory (RAM) for storing intermediate and final results, a timing circuit CT, and a data and control bus control unit BCU, with which mastership of the data and control bus 20 is controlled. For the output of result values, the digital signal processor is connected via the data and control bus to the input of a digital-to-analog converter 24, whose analog output signal $U_{out}$ is transferred to an output 26 of the unit 10 and which, like the input signal $U_{in}$, has the ground 14 at its reference potential.

A supply voltage Ud of, for example, 5 Volts is applied to the digital signal processor 22 through an input 28 of the unit 10. The analog amplifier 16, the analog-to-digital converter 18, and the digital-to-analog converter 24 are fed with a supply voltage Ua of, for example, 12 Volts through a further input 30 of the unit Any further supply and reference voltages that may be necessary, as well as the partial supply of the converters 18, 24 with the supply voltage of the digital signal processor are not shown to simplify the illustration. The clock signals and clock-rate dividers necessary for operation are also not shown.

The analog amplifier 16, the analog-to-digital converter 18, the digital signal processor 22, and the digital-to-analog converter 24 are connected via ground leads 32, 34, 36, 38 to a node 40. This node 40 is connected to a ground terminal 44 of the unit 10 through a line resistance 42. In this simplified representation of the ground wiring, the line resistance 42 with a value $R_L$ represents all coupling resistances that can result within and outside the unit from the common routing of lines.

Voltage drops across this line resistance 42 affect particularly the analog portions of the analog amplifier 16, the analog-to-digital converter 18, and the digital-to-analog converter 24, which use the internal node 40 as a reference potential. This means that the analog amplifier 16, for example, amplifies not the input signal $U_{in}$, but $(U_{in} - R_L \times I_g)$, where $I_g$ is the total power consumption of the unit 10. The power consumptions of the analog amplifier 16, the analog-to-digital converter 18, and the digital-to-analog converter 24 have an approximately constant mean time value, which is influenced only slightly by the applied input signal $U_{in}$ or the output signal $U_{out}$. By contrast, the power consumption of the digital signal processor 22 varies with the activities of the processor.

FIG. 2a shows an example of the allocation of the program memory PC to program routines, and FIG. 2b shows the power consumption of the digital signal processor during execution of the program routines.

Beginning with the program memory address PC-Start in FIG. 2a, a first program routine BP is stored in the program memory. It ends with a WAIT instruction code which switches the digital signal processor to a particularly current-saving wait state which the processor can leave only when an interrupt INT occurs. Within the program routine BP, there are conditional branches which result in this program routine being not completed, but in further program routines AP1, AP2 being executed which also end with a WAIT instruction code. These program routines AP1, AP2 are stored subsequent to the program routine BP.

The interrupt INT, with which the wait state can be left, can be caused, for example, by the analog-to-digital converter 18 (FIG. 1) with the delivery of a new digital output value or, inside the processor, by the timing circuit CT (FIG. 1) at predetermined time intervals.

The power consumption $I_c$ of the digital signal processor during execution of the program routines is plotted in FIG. 2b, beginning with a first interrupt INT. During the execution time $t_b$ of the program routine BP, the mean power consumption $I_c$ reaches a mean value $I_m$.

At the instant $t_1$, the program routine BP executes the final WAIT instruction code, and power consumption decreases to the value $I_w$. The power consumption remains at this value $I_w$ until a further interrupt INT restarts the program routine BP with the mean power consumption $I_m$.

During execution of this program routine BP, a conditional branch causes the program routine AP1 to be executed from the instant $t_3$. This routine ends at the instant $t_4$ with the WAIT instruction code, which causes a change in power consumption to the value $I_w$.

At the instant $t_5$, the program routine BP is started by a further interrupt INT. During execution of this program routine BP, a conditional branch causes the program routine AP2 to be executed from the instant $t_6$. This routine ends at the instant $t_7$ with the WAIT instruction code, which again causes a change in power consumption to the value $I_w$. At the instant $t_8$, a program routine BP is started, which is terminated with the WAIT instruction code at the instant $t_9$, without an additional program routine AP1 or AP2.

As is apparent from the diagram of FIG. 2b, a pulse-like change between the mean power consumption $I_m$ of the program routines BP, AP1, AP2 and the power consumption $I_w$ of the wait state takes place with the repetition period tr of the interrupt signals, the pulse with the mean power consumption $I_m$ of the program routines being subjected to a pulse-width modulation caused by different execution times.

Both the amplitude of the change in power consumption $(I_m - I_w)$ and the spurious signals caused by the pulse-width modulation are disturbing, particularly in audio applications. The change causes a spurious signal in the frequency range 1/tr. The noise spectrum of the pulse-width modulation can be particularly disturbing since it may fall into the frequency range of the useful signal.

FIGS. 3a and 3b show the behavior of the digital signal processor under the same condition as in FIGS. 2a and 2b, but with a wait routine according to the invention implemented in the microcode of the processor. This wait routine can be invoked by a separate instruction code. As far as program memory allocation and run-time performance are identical, the same reference characters as in FIGS. 2a and 2b are used.

Beginning with the program memory address PC-Start in FIG. 3a, a first program routine BP is stored in the program memory. It ends with an AWAIT instruction code. In the microcode of the processor, a wait routine consisting of a data bus read instruction, a multiply-add instruction, and a return to the data bus read instruction is associated with this instruction code AWAIT. By these instructions, the most relevant loads within the digital signal processor are addressed.

The data bus read instruction addresses the bus control units BCU and the ALU or the multiplier, and the multiply and add instruction addresses the multiplier and the ALU, which have a relatively high power consumption. By contrast, execution of the return jump instruction involves low power consumption. This distribution of instructions results in a mean power consumption during the wait routine which corresponds to that of program routines of digital filters.

The power consumption $I_c$ of the digital signal processor during execution of the program routines is plotted in FIG. 3b, beginning at the instant $t_0$ with a first interrupt INT. During the execution time $t_b$ of the program routine BP, the mean power consumption $I_c$ reaches a mean value $I_m$.

At the instant $t_1$, the program routine BP executes the final AWAIT instruction code, and in the microcode of the processor, the above-described wait routine is performed. During this time, the power consumption remains at the mean value $I_m$. In response to a further interrupt INT at the instant $t_2$, the wait routine is aborted and the program routine BP with the mean power consumption $I_m$ is restarted.

During the execution of this program routine BP, a conditional branch causes the program routine AP1 to be executed from the instant $t_3$, which ends with the AWAIT instruction code at the instant $t_4$.

At the instant $t_5$, the program routine BP is started by a further interrupt INT. During execution of this routine, a conditional branch causes the program routine AP2 to be executed from the instant $t_6$, which ends with the AWAIT instruction code at the instant $t_7$. At the instant $t_8$, a program routine BP is started, which is terminated with the AWAIT instruction code at the instant $t_9$, without an additional program routine AP1 and AP2.

What is claimed is:

1. A method of reducing spurious signals caused by changes in power consumed by a processor which includes internal logic that requires varying-amounts of current in accordance with activities performed by said logic, said processor executing a plurality of instructions to control said activities of said internal logic, said power consumed by said processor at a particular time being dependent on a particular one of said plurality of instructions being executed at said particular time, said processor performing cyclically recurring program routines that include sequences of said plurality of instructions, said program routines being repeatedly initiated by said processor, said cyclically recurring program routines having respective run times which result in a first mean power consumption for said processor while running said program routines during said run times, said method comprising the steps of;

performing a predetermined wait routine by said processor between each occurrence of said cyclically recurring program routines; and executing selected operations by said processor during said predetermined wait routine, said selected operations including selected activities performed by said internal logic of said processor to cause said current required by said internal logic to have a predetermined mean current magnitude, said predetermined mean current magnitude causing said power required by said processor to execute said selected operations to have a second mean power consumption while executing said selected operations approximately equal to said first mean power consumption, wherein said internal logic of said processor comprises a data bus, said bus requiring varying amounts of currents in accordance with data transferred on said bus, said selected operations including data transfer instructions that cause data to be transferred on said data bus, said data selected to cause said data bus to require an increased amount of current and to increase said power consumed by said processor during said wait routine.

2. The method as defined in claim 1, wherein said cyclically recurring program routines are initiated by interrupts.

3. The method as defined in claim 2, wherein said run times of said cyclically recurring program routines are shorter than an amount of time between two successive interrupts.

4. The method as defined in claim 1, wherein said processor consumes power while executing said program routines, and wherein said power consumed by said processor while executing said program routines has a first statistical power distribution over time, and wherein said wait routine comprises a sequence of instruction codes which cause said processor to consume power while executing said wait routine, and wherein said power consumed by said processor while executing said wait routine has a second statistical power consumption over time, wherein said second statistical power consumption distribution of said processor is approximately equal to said first statistical power consumption distribution of said processor while performing said program routines.

5. The method as defined in claim 4, wherein said wait routine comprises a sequence of instruction codes in a program memory of said processor, and wherein said sequence of instructions is executed by said processor following said program routines.

6. The method as defined in claim 4, wherein said processor includes microcode, and wherein said wait routine comprises a sequence of instruction codes in said microcode of said processor, and wherein said sequence of instruction codes are executed by said processor when said processor executes a predetermined instruction code.

7. The method as defined in claim 6, wherein each of said cyclically recurring program routines end with said predetermined instruction code which invokes said wait routine in said microcode in said processor.

8. The method as defined in claim 4, wherein said wait routine comprises a data bus read instruction, a multiply-add instruction, and a return to the data bus read instruction.

9. The method as defined in claim 8, wherein said wait routine comprises a sequence of instruction codes in a program memory of said processor, and wherein said sequence of instructions is executed by said processor following said program routines.

10. The method as defined in claim 8, wherein said processor includes microcode, and wherein said wait routine comprises a sequence of instruction codes in said microcode of said processor, and wherein said sequence of instruction codes are executed by said processor when said processor executes a predetermined instruction code.

11. The method as defined in claim 10, wherein each of said cyclically recurring program routines end with said predetermined instruction code which invokes said wait routine in said microcode in said processor.

12. The method as defined in claim 1, wherein said wait routine comprises a sequence of instruction codes in a program memory of said processor, and wherein said sequence of instructions is executed by said processor following said program routines.

13. The method as defined in claim 1, wherein said processor includes microcode, and wherein said wait routine comprises a sequence of instruction codes in said microcode of said processor, and wherein said sequence of instruction codes are executed by said processor when said processor executes a predetermined instruction code.

14. The method as defined in claim 12, wherein each of said cyclically recurring program routines end with said predetermined instruction code which invokes said wait routine in said microcode in said processor.

15. The method as defined in claim 1, wherein said processor is a digital signal processor.

16. The method as defined in claim 1, wherein said internal logic of said processor comprises an arithmetic-logical unit (ALU) and a multiplier, said ALU and said multiplier requiring varying amounts of current in accordance with said operations performed by said ALU and said multiplier and in accordance with values of data on which said operations are performed, said selected operations of said processor including operations performed by said ALU and said multiplier which cause said current to be greater than other non-selected operations such that said power of said processor increase during said wait routine.

* * * * *